United States Patent [19]

Aaltonen

[11] 4,032,073
[45] June 28, 1977

[54] APPARATUS INCLUDING A PUMP MIXER FOR COATING OBJECTS

[76] Inventor: Ragnar Jakob Aaltonen, Norrgardsgatan 25, Hanko, Finland, 10940

[22] Filed: June 10, 1975

[21] Appl. No.: 585,651

[30] Foreign Application Priority Data

June 13, 1974 Finland .............................. 1812/74
June 13, 1974 Finland .............................. 1813/74

[52] U.S. Cl. .............................. 239/142; 239/124; 239/340; 118/326
[51] Int. Cl.² .......................................... B05B 9/00
[58] Field of Search .......... 239/143, 318, 120, 127, 239/142, 340, 121, 122; 118/308, 312, 326, 602, 600, 612; 425/96, 97, 103

[56] References Cited

UNITED STATES PATENTS

| | | | |
|---|---|---|---|
| 1,377,009 | 5/1921 | Dunn .............................. | 239/143 X |
| 1,550,685 | 8/1925 | Eynon et al. ..................... | 239/143 X |
| 1,557,443 | 10/1925 | Elder et al. ..................... | 118/308 X |
| 1,851,176 | 3/1932 | Harvey ............................ | 118/600 X |
| 1,885,012 | 10/1932 | Harvey ............................ | 239/143 X |
| 2,383,946 | 9/1945 | Tietig ............................. | 239/143 X |
| 2,471,049 | 5/1949 | Thornton et al. .............. | 118/308 X |
| 2,707,657 | 5/1955 | Paasche ......................... | 239/143 X |
| 2,766,912 | 10/1956 | Calami ............................ | 239/143 X |
| 3,166,020 | 1/1965 | Cook .............................. | 239/143 X |
| 3,654,896 | 4/1972 | Marx et al. ..................... | 118/326 X |
| 3,756,457 | 9/1973 | Holmes et al. ................. | 239/318 X |
| 3,784,169 | 1/1974 | Bockmann et al. ........... | 239/127 X |
| 3,828,723 | 8/1974 | Herman .......................... | 118/326 X |

FOREIGN PATENTS OR APPLICATIONS

| | | | |
|---|---|---|---|
| 257,549 | 9/1962 | Australia ......................... | 239/143 |
| 32,654 | 10/1964 | Germany ........................ | 239/143 |

*Primary Examiner*—John J. Love
*Attorney, Agent, or Firm*—Wigman & Cohen

[57] ABSTRACT

Apparatus for coating objects with an abrasive or corrosive fluid, for example, coating the surface of chill moulds with lime soup, is disclosed. The apparatus comprises a mixing tank having an impeller for feeding the fluid to an intermediate tank. A plurality of individually directed spray nozzles are arranged to spray fluid from the intermediate tank over the surfaces of inverted chill moulds. A collecting chute and purifying basin are provided for collecting the excess fluid and returning it to the mixing tank. Air is pumped into the bottom of the intermediate tank to prevent silting of the coating fluid.

14 Claims, 3 Drawing Figures

APPARATUS INCLUDING A PUMP MIXER FOR COATING OBJECTS

The present invention concerns an apparatus for coating. In particular, the invention concerns the spraying of desired surfaces with corrosive fluids, such as lime soup, plaster mix, paint, antirust agents and equivalent fluids.

When pig iron is poured with the aid of a foundry machine into small chill moulds, it is necessary to coat the cast iron moulds, every time before pouring, with a lime coat so that the iron does not adhere to the mould. This is performed by spraying the surface of the mould with lime soup as it is returning, empty and in an inverted position, to the pouring point.

Although, theoretically, it is an easy matter to arrange the lime soup spraying, the strong abrasive and corrosive effect of the soup introduces problems, which have not been successfully overcome by the prior art apparatus. In existing liming equipment, the lime soup is mixed in a large tank, where it has to be kept in continuous motion in order to ensure its homogeneity. This is accomplished in prior art apparatus by using a mixing propeller. From this tank, the lime soup is pumped with the aid of a centrifugal pump, although other known pump types are also used to some extent, to a point beneath the moulds. The service life of these pumps is in prior art apparatus on the order of about 1 week. From the tank under the moulds, the lime soup is spread into the moulds, usually, with the aid of an impeller. This impeller has been placed over the tank so that the blades slightly contact the soup. Other designs have also been utilized, but they have not proved sufficiently wear-resistant compared with an impeller, which has a service life on the order of about 1 month in continuous operation. The greatest drawback of the impeller is that it spreads only a fraction of the lime soup to the desired point, i.e., into the mould, while the rest hits the walls of the liming room. Attempts must therefore be made to construct the liming room as tight as possible so that the lime that does not impinge upon the moulds can be recovered. This requires an extensive system of collecting chutes, wherein the lime soup may dry and thereby plug the system. Even with the expedients mentioned, large quantities of the lime are thrown out from the equipment and spread into the environment of the liming machine.

SUMMARY AND OBJECTS OF THE INVENTION

The aim of the invention is to provide an apparatus by which a considerably prolonged service life is achievable and the servicing of which can be substantially reduced, while the contamination of the environment can also be considerably reduced.

The apparatus of the invention includes feed means comprising an impeller encircled by a tunnel member arranged in the mixing tank and which has at one end thereof means partly closing the tunnel member and a feed pipe or equivalent extending from the region of the closed end of the tunnel member.

In order to improve the fluidity of the coating material, it is aerated in the intermediate tank. The coating material excess is preferably returned to the mixing tank.

The present invention also concerns a coating apparatus, which in a manner known in itself in the prior art, has been provided with a coating material mixing tank with feeding means, this apparatus being characterized in that the apparatus furthermore comprises an intermediate tank with spraying means for applying the coating material at the point desired.

The apparatus is furthermore characterized in that the spraying means consist of compressed air nozzles and of suction pipes supplying the coating material from the intermediate tank.

To achieve the desired coating result, it is advantageous if the desired coating result, it is advantageous if the nozzles can be individually oriented so as to spray the lime soup uniformly on the surfaces of the chill moulds.

The present invention, when applied in the chill mould liming process, results in practice in remarkable savings of repair and servicing costs. It is possible, instead of the previous servicing intervals of 1 week at the most, to adopt a 3-month servicing interval, after which the nozzles are serviced and the equipment is cleaned. The rest of the maintenance work can be carried out annually in connection with, for example plant shut-down. It is further noted that the reliability in service substantially increases, owing to the simple construction and the few moving parts. The reliability also is improved by reason of the better directed spraying of the lime soup, whereby the lime soup cannot dry and plug the return chutes. With the aid of the directed nozzles, furthermore, uniform lime application is achieved, and this yields, for instance, a better final result in the casting process and lengthens the service life of the chill mould.

Since the apparatus incorporates arrangements for the return of the lime soup, the lime soup consumption is reduced, because nearly all of the excess lime can be re-utilized.

With these and other objects, advantages and features of the invention that may become hereinafter apparent, the nature of the invention may be more clearly understood by reference to the following detailed description of the invention, the appended claims and to the several views illustrated in the attached drawings wherein:

DETAILED DESCRIPTION OF A PREFERRED EMBODIMENT

Figure 1:
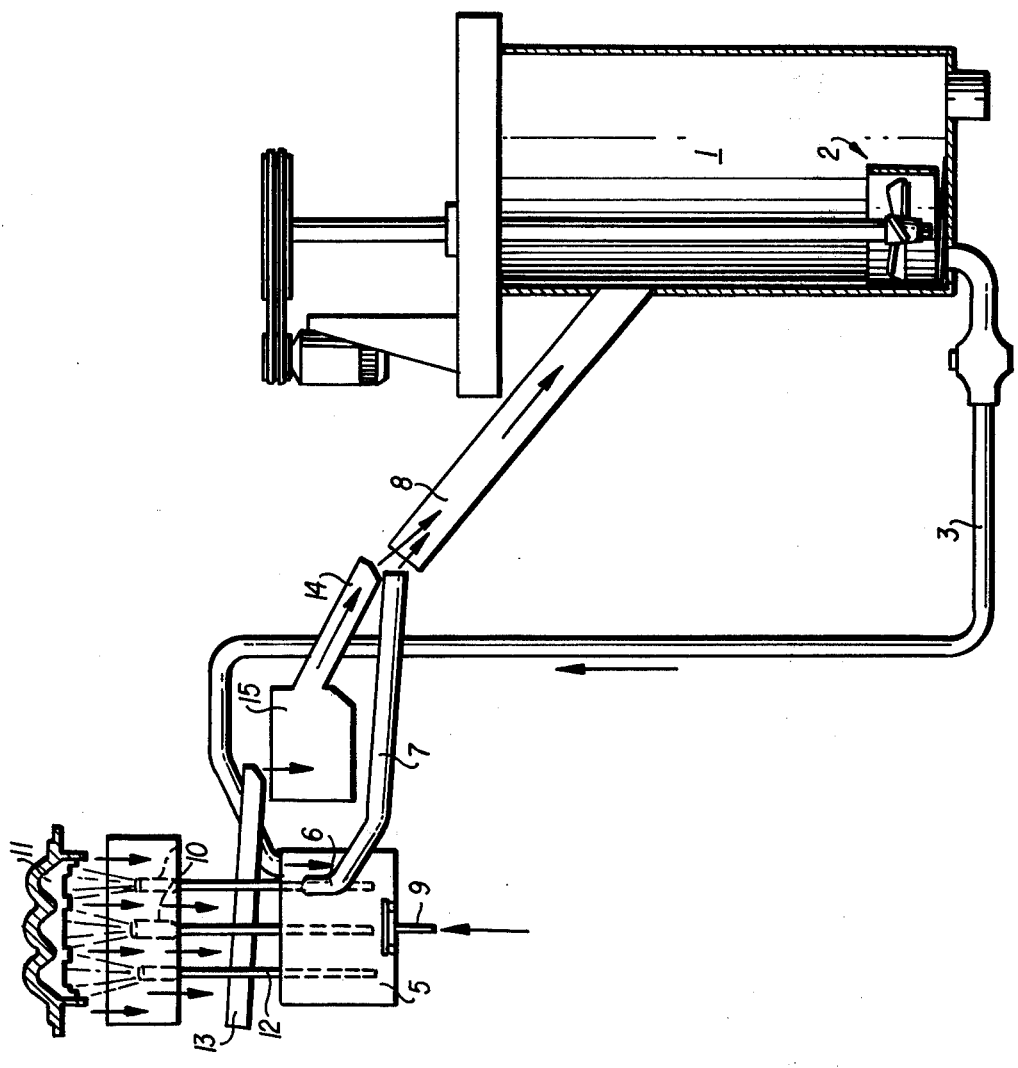
FIG. 1 shows the apparatus applying the invention.

The lime and water for use in the liming machine are added into the mixing tank 1, wherein the pump mixer 2 provided therein mixes the soup and keeps it sufficiently homogenous, and pumps it into the pipe 3. Through the pipe 3, the lime soup is carried into the intermediate tank 5, which has been provided with an overflow pipe 6, from which the excess quantity of lime returns by pipes 7 to the mixing tank 1.

Into the intermediate tank 5 air is pumped through the hole 9 in the bottom, whereby silting of the lime soup is prevented. From the intermediate tank 5, the lime soup is pumped by means of conventional spray pumps 10 to impinge the internal surface of the chill moulds 11. The suction pipes 12 of the spray pumps 10 have been made short, and the parts of the spray pumps 10 subject to wear consist of hard metal. The air for the operation of the spray pumps is derived from a general compressed air system with about 6 bar pressure through magnetic valves, which have not been depicted. The operation of the magnetic valves has been linked with the operation of the casting machine. Each of the spray pumps 10 can be individually directed, whereby a uniform distribution of the lime soup over the chill mould surface is obtained. Under the moulds a collecting chute 13 had been provided, into which the excess quantity of the lime soup falls, while the rest rapidly dries on the warm surface of the chill mould. From the collecting chute 13, the lime suspension is conducted through a purifying basin 15 and thence through pipes 14 and 8 back to the mixing tank 1.

Figure 2:
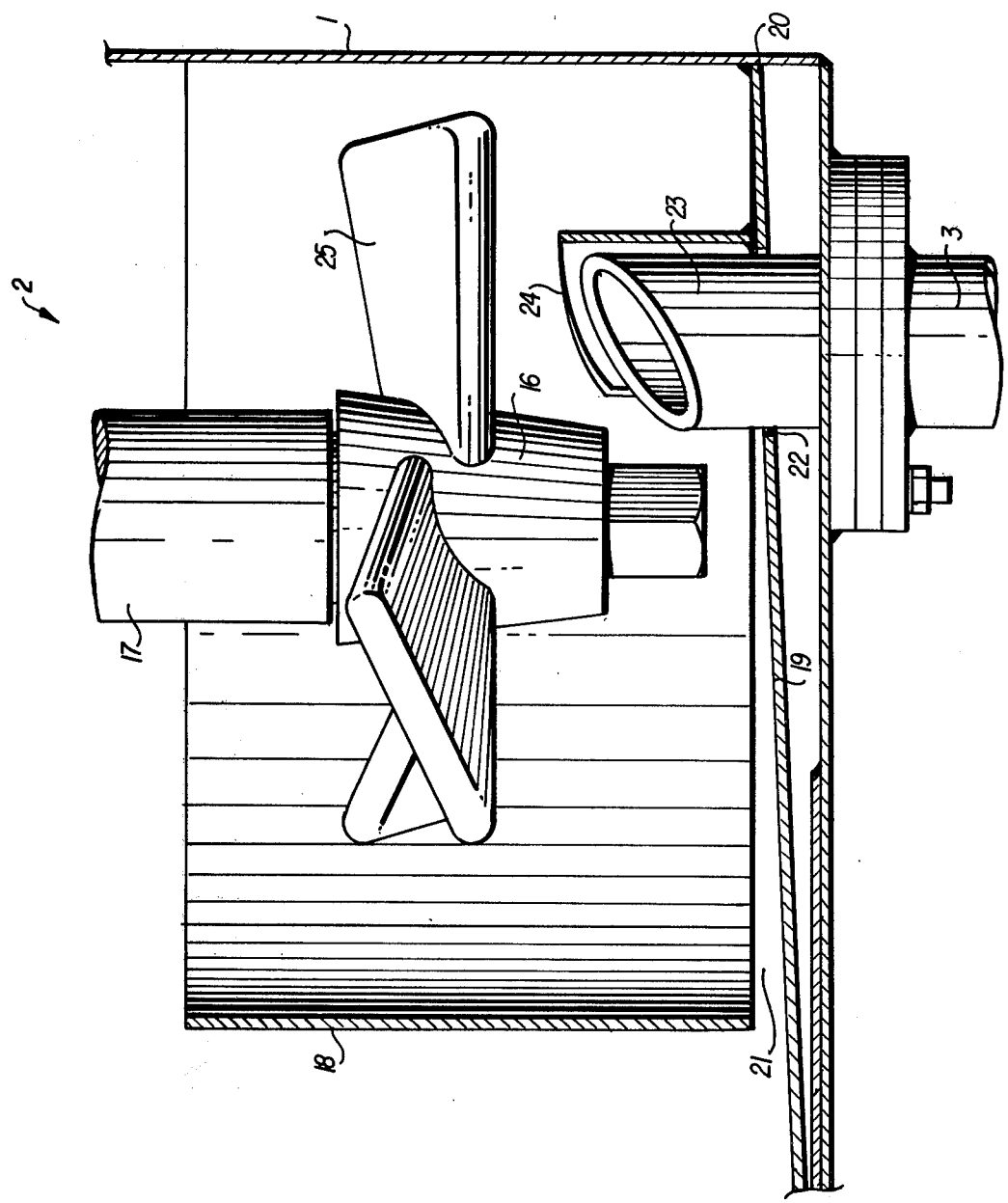
FIG. 2 shows in detail a longitudinal section of the feed means.
Figure 3:
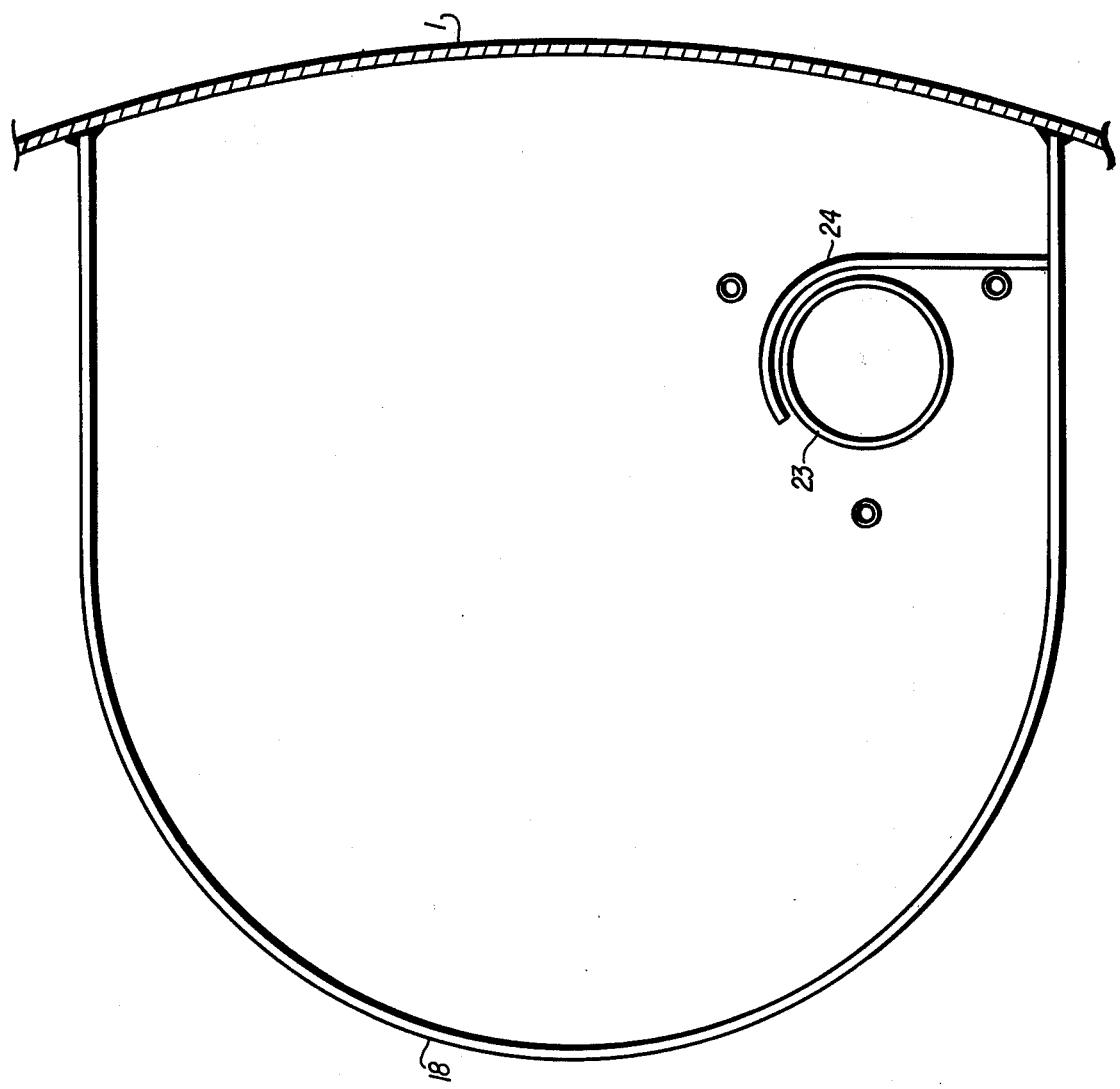
FIG. 3 shows the feed means as viewed from above, with the impeller and its drive means removed.

The portion of the apparatus shown in FIG. 2, i.e., the pump mixer 2, is arranged in the lower portion of the lime soup mixing tank 1. The impeller 16, which is a three-bladed propeller having oblique and equispaced blades 25, is rotated by an electric motor, not shown in FIG. 2, by a shaft 17. The motor is mounted outside the tank as best seen in FIG. 1. The impeller is located approximately in the center of the tunnel member 18 which forms with the wall of the mixing tank 1 a generally tubular structure having a diameter slightly larger than the outer diameter of the impeller. The direction of rotation of the impeller is chosen such that it produces a downward flow in the tunnel member 18. At the lower end of the tunnel member 18, a plate-shaped closure means 19 has been welded in an oblique orientation so that it contacts the mixing tank wall part of the tubular member 18 at a point 20 and such that the gap 21 between the tunnel member and the plate 19 increases therefrom towards the other side of the tunnel member 18. The oblique plate 19 is provided, close to the outer rim of the circle described by the impeller, with a hole 22, in which the feed tube 23 has been mounted, and which has been cut off obliquely a short distance above the oblique plate 19. The mouth of the pipe has partly been encircled, as shown in the figure, with a flow deflector 24, by the aid of which the flow passing through the pipe can be regulated.

The tunnel-shaped member 18 in FIG. 2 can partly be formed by the wall 1 of the lime soup tank, and partly by a U-shaped member 18.

The vertical height of the tunnel member 18 is preferably not less than twice but at least three times the vertical height of the propeller blades 25. The cross section of the feed pipe 23 is preferably less than one-fourth the area of a circle described by the circumference of the propeller blade 25. The feed pipe 23 is advantageously located substantially parallel to the axis of the propeller within the described circle of the propeller blades 25 and close to the circumference of such circle. The oblique end of the feed pipe 23 preferably has a maximum inclination with respect to the propeller radius of about 90°.

By the design described above, an apparatus is obtained which performs a highly efficient mixing of the lime soup, rendering it homogeneous, and which furthermore pumps the requisite quantity of lime soup either directly onto the surface of the chill moulds or into an intermediate tank in the vicinity of the pouring machinery. A most remarkable advantage is achieved, by an apparatus of the kind described, in the servicing and repair costs. In the apparatus of the invention the wear is confined, despite the abrasive effect of the lime soup, to minimal wear in the tunnel opposite to the impeller, and to the impeller itself. Still, the service life periods obtainable with them, as well as the useful life of the whole equipment without need of repair, is on the order of several years. In experiments that have been carried out, service lives longer than 1 year have been attained with regard to all and any components, in continuous use. In addition to being highly reliable in service, the apparatus described is inexpensive to manufacture and its energy consumption is of the same order as that of a mere mixer.

The invention just described may also be carried out with a direction of passage of the lime soup opposite to that in the example, and with the throttling point located above the propeller. This may be required in large tanks, because it is then possible to carry the propeller shaft in bearings affixed to this cover, in order to eliminate vibrations. The apparatus of the invention may also be employed in the mixing and transportation of other abrasive or easily silting substances.

The apparatus of the invention may be used also for other lime soup spraying operations in addition to the liming of the chill moulds in a casting machine.

It should be noted that the examples described in the foregoing and illustrated by the drawings present embodiments of the invention. Other embodiments of the invention may differ from the above within the scope of the claims, particularly as regards the material that is pumped, and the object which is sprayed.

I claim:

1. Apparatus for coating objects with a coating material, such as lime, comprising a mixing tank for containing the coating material, an intermediate tank connected to said mixing tank, means for feeding the coating material from said mixing tank to said intermediate tank and means for spraying the coating material fed to said intermediate tank on the subject to be coated, said feed means including an impeller positioned in said mixing tank, a tunnel member at least partly encircling said impeller and having upper and lower ends, closure means for partly closing the lower end of said tunnel member and a feed pipe extending from the lower, partly closed end of said tunnel member to said intermediate tank.

2. Apparatus according to claim 1, wherein said spraying means comprises air spray nozzles having suction pipes extending into the coating material in said intermediate tank.

3. Apparatus according to claim 1, including means for collecting the excess coating material sprayed on the object to be coated and an overflow means connected to said intermediate tank for returning to said mixing tank the excess coating material supplied to said intermediate tank by said feed means.

4. Apparatus according to claim 1, wherein said impeller is a bladed mixing propeller.

5. Apparatus according to claim 1, wherein said tunnel member is generally cylindrical in cross-section and is slightly spaced from the outer circumference of said impeller.

6. Apparatus according to claim 1, wherein said tunnel member is U-shaped and has a arcuate portion the radius of which is slightly larger than the radius of the impeller.

7. Apparatus according to claim 4, wherein the vertical height of said tunnel member is at least three times the vertical height of the blades of said propeller.

8. Apparatus according to claim 1, wherein said closure means is a plate arranged substantially centrally of the tunnel member.

9. Apparatus according to claim 1, wherein said closure means is obliquely arranged with respect to the axis of rotation of the impeller and abuts the tunnel member at one side thereof.

10. Apparatus according to claim 1, wherein the cross-sectional area of the feed pipe is less than one-fourth the area of a circle described by the outer circumference of the impeller.

11. Apparatus according to claim 10, wherein the feed pipe is arranged parallel to the axis of rotation of the impeller and has an opening in one end arranged within said circle close to the circumference thereof.

12. Apparatus according to claim 11, wherein said one end of the feed pipe is obliquely positioned with respect to the radial plane of the impeller.

13. Apparatus according to claim 12, including a flow deflector arranged adjacent said feed pipe.

14. Apparatus according to claim 1, wherein said tunnel member, impeller, closure means and feed pipe are submerged in the coating material contained in said mixing tank.

* * * * *

UNITED STATES PATENT AND TRADEMARK OFFICE
CERTIFICATE OF CORRECTION

PATENT NO. : 4,032,073
DATED : June 28, 1977
INVENTOR(S) : Ragnar Jakob Aaltonen It is certified that error appears in the above-identified patent and that said Letters Patent are hereby corrected as shown below:

Column 2, line 10, delete "the desired coating result, it is advantageous if";

Column 2, line 65, after "impinge" insert --upon--;

Column 3, line 9, change "had" to --has--;

Claim 1, line 35, change "subject" to --object--.

Signed and Sealed this

Twenty-ninth Day of November 1977

[SEAL]

Attest:

RUTH C. MASON
*Attesting Officer*

LUTRELLE F. PARKER
*Acting Commissioner of Patents and Trademarks*